(12) United States Patent  
Moss et al.

(10) Patent No.: US 9,064,204 B1
(45) Date of Patent: Jun. 23, 2015

(54) FLEXIBLE IMAGE PROCESSING APPARATUS AND METHOD

(71) Applicant: Marvell International Ltd., Hamilton (BM)

(72) Inventors: Roy G. Moss, Palo Alto, CA (US); Douglas Gene Keithley, Boise, ID (US); Nilotpal Sensarkar, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/253,389

(22) Filed: Apr. 15, 2014

Related U.S. Application Data

(63) Continuation of application No. 13/160,288, filed on Jun. 14, 2011, now Pat. No. 8,717,628.

(60) Provisional application No. 61/357,865, filed on Jun. 23, 2010.

(51) Int. Cl.
*G06K 15/02* (2006.01)

(52) U.S. Cl.
CPC .................... *G06K 15/1872* (2013.01)

(58) Field of Classification Search
USPC ......... 358/1.9, 2.1, 1.2, 3.28, 1.11, 1.13, 468, 358/406, 504; 382/181–183, 195, 199
See application file for complete search history.

(56) References Cited

U.S. PATENT DOCUMENTS

| | | | |
|---|---|---|---|
| 5,444,779 | A | 8/1995 | Daniele |
| 6,256,411 | B1 | 7/2001 | Iida |
| 7,196,813 | B2 | 3/2007 | Matsumoto |
| 8,305,646 | B2 | 11/2012 | Nakajima |

*Primary Examiner* — Thomas D Lee
*Assistant Examiner* — Stephen M Brinich

(57) ABSTRACT

Some of the embodiments of the present disclosure provide an apparatus for processing a starting image, comprising: a first unit configured to provide starting pixel data from a selected portion of the starting image, wherein the selected portion is less than an entirety of the starting image; and a second unit configured to receive the starting pixel data from the first unit and to selectively provide to a look up table (LUT) an address of replacement pixel data for at least a pixel of the selected portion of the starting image. Other embodiments are also described and claimed.

20 Claims, 4 Drawing Sheets

FLEXIBLE IMAGE PROCESSING APPARATUS AND METHOD

CROSS REFERENCE TO RELATED APPLICATIONS

The present disclosure is a continuation of and claims priority to U.S. patent application Ser. No. 13/160,288, filed Jun. 14, 2011, now U.S. Pat. No. 8,717,628, issued May 6, 2014, which claims priority to U.S. Provisional Patent Application No. 61/357,865, filed Jun. 23, 2010, which are incorporated herein by reference.

TECHNICAL FIELD

The present disclosure is generally directed to the field of image processing, for example, to the flexible application of linear and non-linear transformations to an image.

BACKGROUND

Unless otherwise indicated herein, the approaches described in this section are not prior art to the claims in the present disclosure and are not admitted to be prior art by inclusion in this section.

There are many applications in which image processing techniques are employed. For example, image processing techniques are useful in certain printing, photographic, and video applications, e.g., to enhance or otherwise transform images. Some examples of image transformations include adjusting image characteristics such as contrast, brightness, gamma, hue, saturation, tint, etc.; image deskewing or other rotation; red-eye removal; image recognition, e.g., character recognition, face detection, scene detection, etc.; image sharpening or softening; image interpolation or extrapolation; and image upscaling or image downscaling.

While software based image processing and hardware based image processing have been previously employed, disadvantages are associated with both software based image processing and hardware based image processing. For example, software based image processing generally relies upon resources of a host device such as a general purpose computer and is typically slower than hardware based image processing. In contrast, hardware based image processing is generally faster than software based image processing. However, typical hardware based image processors are typically inflexible. For example, hardware based image processors are typically designed and manufactured for a custom instruction set that is designed to perform only limited types of image transformations. Further, adding support for additional types of image transformation generally necessitates significant hardware redesign.

SUMMARY

In various embodiments, the present disclosure provides an apparatus for processing a starting image, comprising: a first unit configured to provide starting pixel data from a selected portion of the starting image, wherein the selected portion is less than an entirety of the starting image; and a second unit configured to receive the starting pixel data from the first unit and to selectively provide to a look up table (LUT) an address of replacement pixel data for at least a pixel of the selected portion of the starting image. The apparatus further comprises the LUT, wherein the LUT is configured to provide the replacement pixel data for at least the pixel of the selected portion according to the address from the second unit; and a third unit configured to receive the replacement pixel data from the LUT, to receive the starting image, and to generate a modified image according to the starting image and the replacement pixel data. The first unit is further configured to control selection of the selected portion and to traverse the selected portion over multiple areas of the starting image. The apparatus further comprises a print engine configured to print the modified image onto a tangible medium. The second unit includes one multiplexer for each bit of the address of the replacement pixel data, wherein each of the multiplexers is configured to provide one address bit to the LUT according to a subset of the starting pixel data from the selected portion or according to a subset of metadata.

In various embodiments, there is also provided a method of processing an image, comprising receiving a starting image; selecting a portion of the starting image, wherein the selected portion is less than an entirety of the starting image; selecting, via a multiplexer, a subset of starting pixel data from the selected portion of the starting image; looking up replacement pixel data for at least a pixel of the selected portion at an address that is based on the selected subset of starting pixel data; and generating a modified image according to the starting image and the replacement pixel data. The method further comprises traversing the selected portion over multiple areas of the starting image; and for the selected portion of each of the multiple areas selecting, via the multiplexer unit, a particular subset of starting pixel data associated with the particular selected portion, and looking up replacement pixel data for at least a pixel of the particular selected portion at an address based on the particular selected subset of starting pixel data. The method further comprises providing the modified image to a print engine; and printing, by the print engine, the modified image onto a tangible medium.

In various embodiments, there is also provided an apparatus for processing an image, comprising means for receiving a starting image; means for selecting a portion of the starting image, wherein the selected portion is less than an entirety of the starting image; means for selecting a subset of starting pixel data from the selected portion of the starting image; means for looking up replacement pixel data for at least a pixel of the selected portion at an address based on the selected subset of starting pixel data; and means for generating a modified image according to the starting image and the replacement pixel data.

BRIEF DESCRIPTION OF THE DRAWINGS

Embodiments are illustrated by way of example and not by way of limitation in the figures of the accompanying drawings, in which like references indicate similar elements.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For clarity of illustration, various signals may be illustrated in the figures using a single line. However, any such illustration should not be construed as limiting such a signal to being a single-bit signal. Rather, such signals may be multi-bit signals, unless specifically described in this Detailed Description as being only a single-bit signal.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
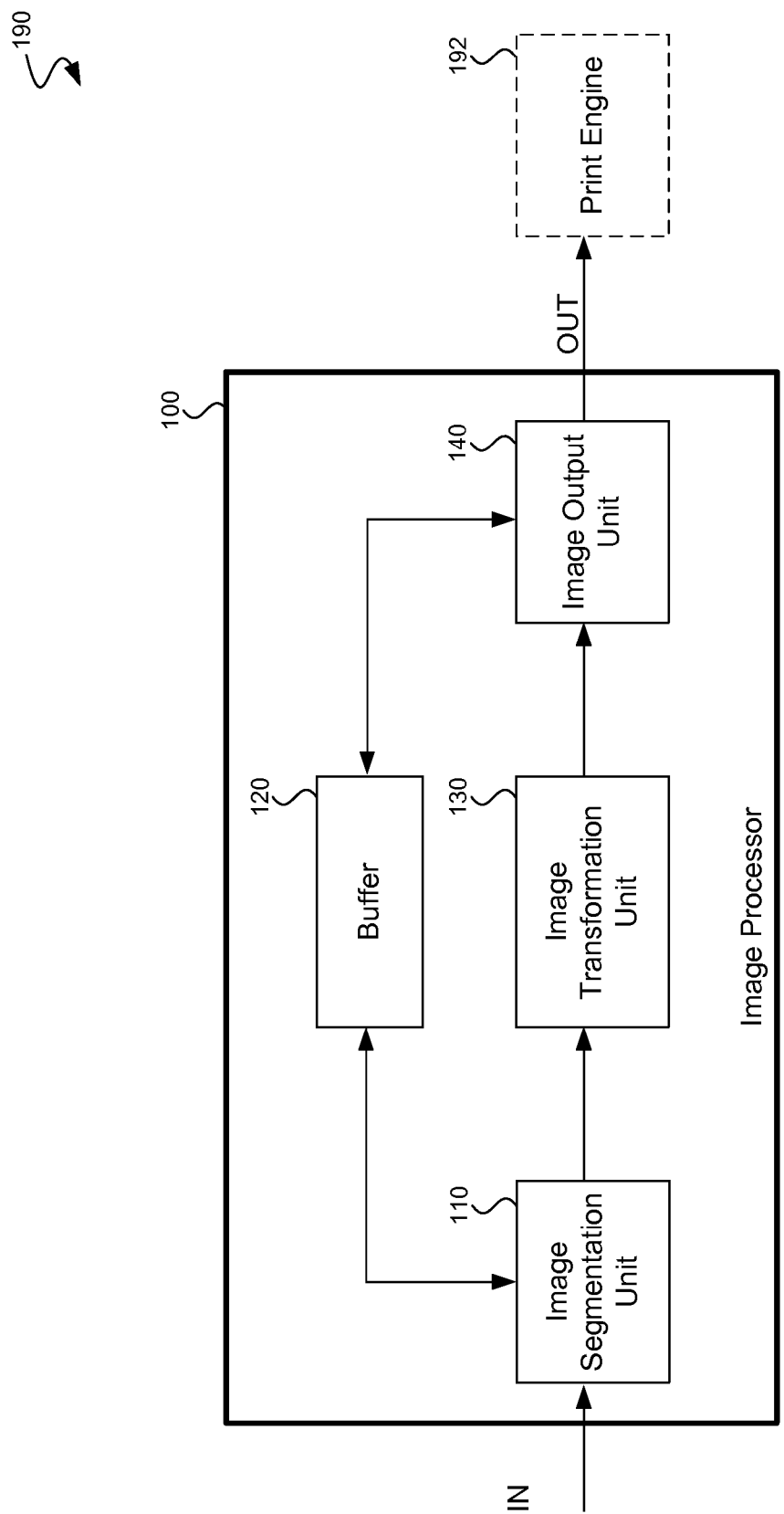
FIG. 1 is a block diagram of an imaging system in accordance with an embodiment of the present disclosure.

FIG. 1 is a block diagram illustrating one embodiment of major components of imaging system 190. Imaging system 190 includes image processor 100 and optionally includes print engine 192.

As shown in FIG. 1, image processor 100 includes image segmentation unit 110, buffer 120, image transformation unit 130, and image output unit 140. Image processor 100 is configured to perform an image transformation on starting image IN to generate and provide modified image OUT. In one embodiment, image processor 100 is formed as a monolithic image processing integrated circuit, e.g., with image segmentation unit 110, buffer 120, image transformation unit 130, image output unit 140, and/or the subcomponents thereof, formed as circuits of the monolithic image processing integrated circuit.

In one embodiment, starting image IN and modified image OUT are in pixel mapped format, for example, with starting image IN and modified image OUT each including a plurality of pixels, and with each pixel being represented by a multi-bit value (i.e., each pixel is represented by an N-bit value, where N is greater than one). As one example, each pixel of starting image IN and modified image OUT is represented by a two-bit value (e.g., black, white, and two gray levels). In another embodiment, starting image IN and modified image OUT are in a bitmapped format, for example, with each pixel represented by a one-bit value (e.g., black and white).

In yet another embodiment, starting image IN is in a different format than modified image OUT. As one example of use of different input and output formats, an embodiment of image processor 100 is configured to perform upscaling or downscaling of input image IN into modified image OUT. With such an example, a number of bits used to represent a pixel in the starting image IN is different from a number of bits used to represent a corresponding pixel in the modified image OUT. In another example, a total number of pixels in the starting image IN is different from a total number of pixels in the modified image OUT.

As noted above, image processor 100 of FIG. 1 is configured to perform an image transformation on starting image IN to generate and provide modified image OUT. Such image transformation may include pixel-by-pixel image processing, including successive analysis and potential modification of multiple portions of the image. Stated another way, such processing includes traversing a processing "window" over the image, and analyzing and potentially modifying the pixel data within each window position while the pixel data is in the window. By employing this window-based image processing, each pixel within starting image IN can be analyzed and potentially modified based on its surrounding pixels. Further details regarding suitable window-based image transformation processes are described in U.S. Pat. No. 7,340,105, entitled "Method and Apparatus for Image Processing;" U.S. Pat. No. 7,587,096, entitled "Method and Apparatus for Image Processing;" U.S. Pat. No. 7,697,169, entitled "Laser Print Apparatus With Toner Explosion Compensation;" and U.S. Pat. No. 7,483,595, entitled "Image Processing Method and Device," all of which are hereby incorporated by reference in their entirety for all purposes, except for those sections, if any, that are inconsistent with this specification.

Image processor 100 is also particularly suitable for performing non-linear image transformations due to use of the aforementioned window-based image processing. For example, image processor 100 may be suitably employed to perform non-linear image transformations such as line and/or curve enhancement (e.g., line thickening, line thinning, reduction of "jaggies" and/or other artifacts, etc.), toner explosion compensation, image lightening (e.g., toner conservation) or darkening, upscaling or downscaling of image resolution and/or image pixel depth, image shifting, dithering, and/or the like. Use of window-based image processing also enables image processor 100 to perform any other linear non-linear image transformation, including pattern matching based pixel modification (e.g., character/text and/or any other font/pattern replacement).

As shown in FIG. 1, image segmentation unit 110 is configured to receive starting image IN and is coupled to both buffer 120 and image transformation unit 130. In one embodiment, image segmentation unit 110 is configured to store a received starting image IN into buffer 120 and to control the window traversal of the window-based image transformation process. More specifically, image segmentation unit 110 is configured to control selection of a selected portion, e.g., a "window," and to successively traverse the selected portion over multiple areas of starting image IN. In addition, image segmentation unit 110 is also configured to retrieve the pixel data of each selected portion of starting image IN from buffer 120 and provide it to image transformation unit 130 for analysis and potential modification. In one embodiment, image segmentation unit 110 includes a rotator based de-multiplexer for retrieving the pixel data from the selected portion of starting image IN from buffer 120. Also, in one example, image segmentation unit 110 is configured to control selection of an 8×8 pixel selected portion. However, other dimensions of selected portions are employed in other embodiments.

In some embodiments, image segmentation unit 110 is also configured to perform preliminary analysis of the pixel data of the selected portion and to provide one or more metadata outputs to image transformation unit 130 based on such preliminary analysis. For example, an image segmentation unit 110 of at least one embodiment is configured to provide metadata indicating whether the pixels of the selected portion match a predetermined pattern; whether the selected portion is horizontally stable (e.g., having a predetermined number of neighboring pixels from a row of pixels with same or similar values); whether the selected portion is vertically stable; whether the selected portion is neither horizontally or vertically stable; an indication of the location of the selected portion within starting image IN (e.g., whether the selected portion abuts an edge of starting image IN, whether the selected portion is within a given portion of starting image IN, etc.); an indication of movement of the selected portion relative to the previous selected portion (e.g., an indication of how many horizontal and/or vertical pixels the selected portion has been moved); and/or an indication of a position of the current processing window inside the image. As an example, the indication of movement of the selected portion may be provided by either a linear counter or a non-linear counter.

As shown in FIG. 1, buffer 120 is configured to store image data such as starting image IN as it is transformed into modified image OUT. In one embodiment, upon receiving starting image IN by image segmentation unit 110, image segmentation unit 110 stores starting image IN into buffer 120 in native/original resolution. As starting image IN is traversed during window-based image processing, image segmentation unit 110 then retrieves selected portions of starting image IN from buffer 120 and provides them to image transformation unit 130 for processing. After processing of each selected portion, changes to the particular selected portion, if any, can be written back into buffer 120 by image output unit 140 thus generating modified image OUT.

In one embodiment, buffer 120 is a bit writable buffer. For example, use of a bit writable buffer for buffer 120 improves memory utilization and processing speed as individual pixel modifications can be immediately written to buffer 120 without intermediate buffering and without necessitating use of multiple bits (e.g., a memory row) to store the data of each pixel. However, other suitable buffers are employed in other embodiments.

As shown in FIG. 1, image transformation unit 130 is coupled to image segmentation unit 110 and image output unit 140. In one embodiment, image transformation unit 130 is configured to perform window-based image processing transformations on image portions provided by image segmentation unit 110 and to provide the output of such transformation to image output unit 140. Further details regarding image transformation unit 130 are described below with respect to the following figures.

In one embodiment, image output unit 140 is configured to interface image transformation unit 130 to buffer 120 and to image output unit 140. For example, image output unit 140 of FIG. 1 is configured to receive the output of image transformation unit 130 and to write replacement pixel data to buffer 120 to generate modified image OUT. In addition, image output unit 140 is also configured to output modified image OUT, for example to print engine 192 or to another output device.

As shown in FIG. 1, print engine 192 is configured to print modified image OUT onto a tangible medium. In one embodiment, print engine 192 is a monochrome laser print engine configured to print modified image OUT onto paper. However, other print engines such as color inkjet engines, monochrome inkjet engines, and color inkjet engines are also suitable for print engine 192 in other embodiments. Print engine 192 may also be configured to print modified image OUT onto any suitable medium. In yet other embodiments, print engine 192 is omitted and modified image OUT is retained in electronic form or is provided to another output device such as a display.

While various units in FIG. 1 are illustrated separately, in an embodiment, one or more units can be integrated. For example, the image segmentation unit 110 can be integrated with the image transformation unit 130 such that the integrated unit performs the functions of the image segmentation unit 110 and the image transformation unit 130.

Figure 2:
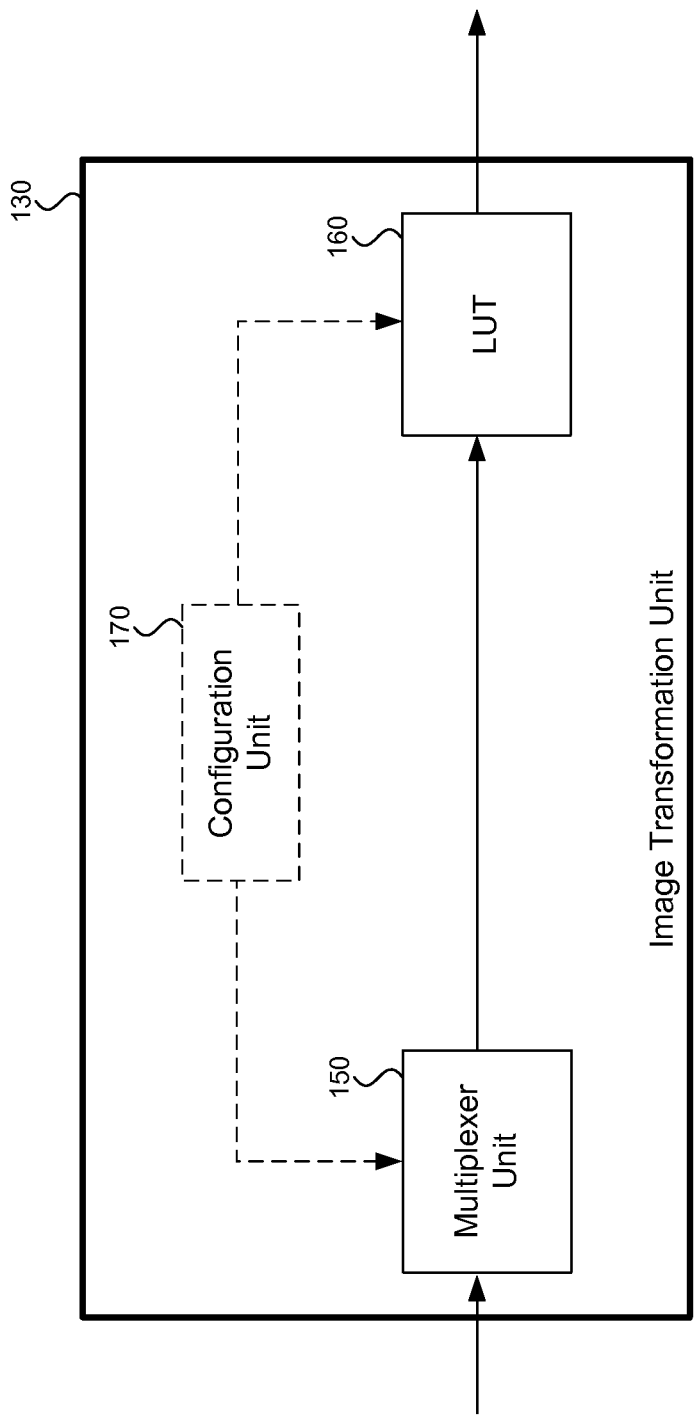
FIG. 2 is a block diagram of image transformation unit 130 of FIG. 2 in accordance with an embodiment of the present disclosure.

FIG. 2 is a block diagram illustrating major components of one embodiment of image transformation unit 130 of FIG. 1. As shown, image transformation unit 130 includes multiplexer unit 150, look up table (LUT) 160, and configuration unit 170. As discussed above, image transformation unit 130 of a previously discussed embodiment is configured to perform window-based image processing transformations on image portions provided by image segmentation unit 110 and to provide the output of such transformations to image output unit 140. More specifically, the image transformation unit 130 of the aforementioned embodiment is configured to provide replacement pixel data for one or more pixels of a selected portion based on values of a subset of the pixels within the selected portion and/or metadata associated with the selected portion.

In one embodiment, multiplexer unit 150 is configured to receive the starting pixel data and/or metadata from image segmentation unit 110 and to selectively provide a subset of this starting pixel data and/or metadata associated with the selected portion to LUT 160 as an address for replacement pixel data, such as replacement values for one or more center pixels of the selected portion, which is then provided to image output unit 140 by LUT 160.

Correspondingly, LUT 160 is configured to provide the replacement pixel data for one or more pixels of the selected portion according to the address from multiplexer unit 150, e.g., by looking up replacement pixel data value stored at the address provided by multiplexer unit 150. However, in certain embodiments, additional replacement pixel data is also stored in LUT 160 and is thus retrievable if multiplexer unit 150 provides an address for the additional replacement data. For example, if a particular embodiment of image processor 100 employs pattern matching based pixel modification, multiplexer unit 150 and LUT 160 are additionally configured to provide all or part of a replacement pattern (e.g., all or a larger number of pixels of the selected portion than with non-pattern matching pixel replacement) to image output unit 140. Also, with such an example, the replacement pattern may include or be a portion of a character, a portion of a font, and/or any appropriate pattern. To facilitate such an embodiment, LUT 160 may include certain elements with more bits per element than other element. For example, the majority of the elements of such a LUT may include only a few bits of data storage (e.g., sufficient to store replacement pixel data for one or more center pixels of the selected portion) while a minority of elements include a greater number of bits (e.g., sufficient to store a larger replacement pattern). Other variations are possible.

In typical embodiments, multiplexer unit 150 includes one multiplexer for each bit in the replacement pixel data address. Accordingly, a multiplexer unit having 20 multiplexers is capable of providing a 20 bit address to LUT 160, and hence is capable of addressing 2^20 (1,048,576) LUT elements. However, LUTs having less than the full number of elements addressable by LUT 160 can also be suitably employed, for example, by hard-coding, masking, of otherwise disabling one or more multiplexers. Also, each of the multiplexers in multiplexer unit 150 may be configured to provide any suitable pixel value, a portion thereof (e.g., a most significant bit of a pixel value, a least significant bit of a pixel value, etc.), a value of metadata corresponding the selected portion, a portion thereof, and/or the like.

The above-described use of multiplexer unit 150 to address replacement pixel data from LUT 160 based on values of a subset of possible pixel values and/or metadata provides significant flexibility over prior LUT-based image transformation processors. For example, LUT-based image transformation processors having fixed mappings between LUT address bits and pixel locations of the selected portion window are unable to look up replacement pixel data based on values at unmapped pixel locations. In addition, for such fixed mapping processors to provide similar post-design look up flexibility, such processors would utilize a much larger LUT (e.g., a $2^{64}$ element LUT for full flexibility, if used in conjunction with a 8×8 window of one-bit pixel data).

In contrast, inclusion of multiplexer unit 150 in image processor 100 provides a larger degree of post-design flexibility. For example, different users/customers of image processor 100 are provided with the ability to configure multiplexer unit 150 to address LUT 160 based on pixel data and associated metadata that is relevant to a particular application in which image processor 100 is being employed. For example, as previously discussed, the multiplexer unit 150 can be configured to provide any suitable pixel value, a portion thereof, a value of metadata corresponding the selected portion, a portion thereof, and/or the like to the LUT 160 based on, for example, an application area of the image processor 100. For example, for a first type of image processing operation, the multiplexer unit can be configured in a manner which is different from a configuration of the multiplexer unit for a different image processing operation. As will be discussed in more detail herein later with respect to FIG. 4, configuration of the multiplexer unit 150 is based on selection signals, which are used to selectively generate the input addresses of the LUT 160.

In addition, by employing the use of metadata as part of a LUT address, such as discussed above, image processor 100 provides even further flexibility in the types of supported image transformation. For example, use, by multiplexer unit 150, of metadata generated by image segmentation unit 110 or other elements is akin to "distilling down" characteristics of pixel data. Without employing metadata to represent these characteristics, these characteristics would generally undetectable by image transformation unit 130 without the use of additional LUT address bits and the corresponding increase in LUT size.

Finally, as shown in FIG. 2, configuration unit 170 is optionally included in image transformation unit 130. In one embodiment, configuration unit 170 is configured as an interface for controlling the configuration image transformation unit 130 by providing multiplexer selection signals to multiplexer unit 150 based upon input received from internal or external sources. In one embodiment, configuration unit 170 includes registers and other logic/circuits configured to latch and drive select signals to multiplexers of multiplexer unit 150. Optionally, configuration unit 170 may be additionally configured to load or otherwise program data into LUT 160, e.g., to initialize or change such data.

Figure 3:
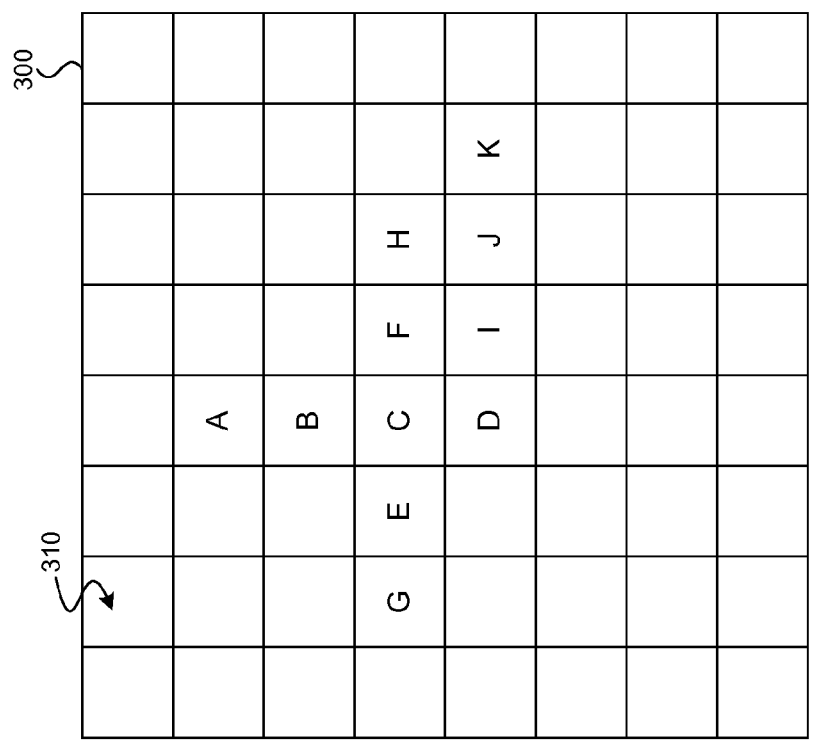
FIG. 3 is a logical illustration of a template for multiplexing a selected portion of image data in accordance with an embodiment of the present disclosure.
Figure 4:
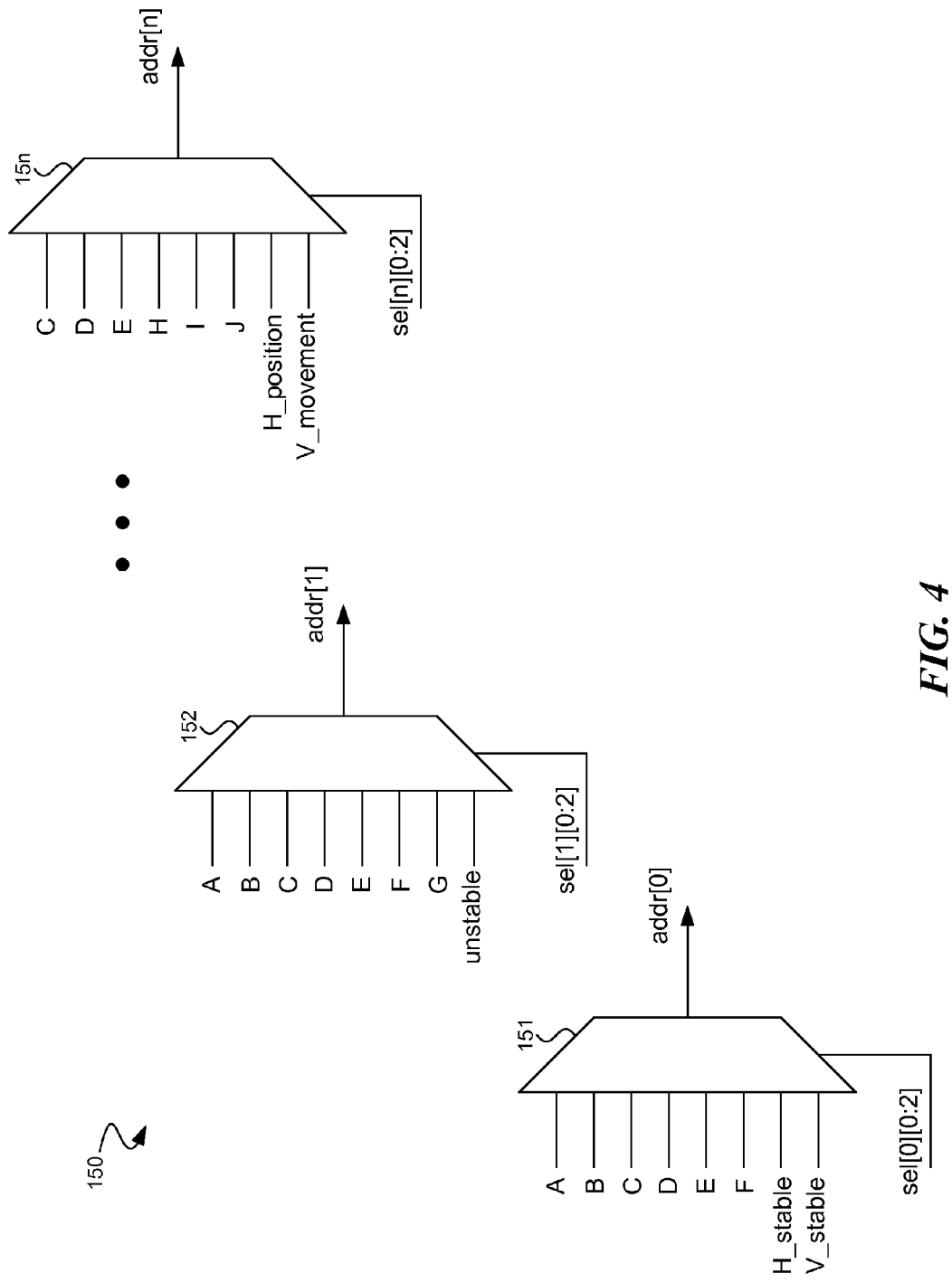
FIG. 4 is a schematic diagram of multiplexer unit 150 of FIG. 3 in accordance with an embodiment of the present disclosure.

FIG. 3 is a logical illustration of a template for multiplexing a selected portion of image data in accordance with an embodiment of the present disclosure. FIG. 4 is a schematic diagram of multiplexer unit 150 of FIG. 2 in accordance with an embodiment of the present disclosure.

As shown in FIG. 3, selected portion 300 includes an 8×8 array of pixels 310. In FIG. 3, pixel locations A-K are labeled to facilitate discussion of multiplexer unit 150 of FIG. 4. As previously discussed, selected portion 300 represents a "window" that can be logically overlaid on a portion of a pixel mapped image data. Pixel locations A-K are generally static relative to selected portion 300, but the values of the pixels at these locations may change as selected portion 300 is traversed across the image data.

As shown in FIG. 4, the embodiment of multiplexer unit 150 includes multiplexers 151-15n. Each multiplexer is controlled by a corresponding selection signal, as illustrated in FIG. 4. For example, multiplexer 151 is controlled by selection signal Sel[0][0:2], multiplexer 152 is controlled by selection signal Sel[1][0:2], and so on. In the illustrated embodiment of FIG. 3 and FIG. 4, multiplexer 151 is configured to selectivity provide (e.g., based on selection signal Sel[0][0:2]) a pixel value from one of pixels A-F, an indication of horizontal image stability, or an indication of vertical image stability as address bit addr[0] to LUT 160. Likewise, multiplexer 152 is configured to selectivity provide (e.g., based on selection signal Sel[1][0:2]) a pixel value from one of pixels A-G or an indication image instability as address bit addr[1] to LUT 160. And, multiplexer 15n is configured to selectivity provide (e.g., based on selection signal Sel[n][0:2]) a pixel value from one of pixels C-E, a pixel value from one of pixels or H-J, an indication of the horizontal position of selected portion 300, or an indication of vertical movement of selected portion 300 relative to a previous selected portion as address bit addr[n] to LUT 160.

However, FIG. 4 illustrates only one of many possible embodiments of multiplexer units and it is noted that FIG. 3 and FIG. 4 are embodiments that are simplified for clarity of explanation. For example, in another embodiment, 20 multiplexers are included in a multiplexer unit. In this other embodiment, each of the multiplexers is a 64:1 multiplexer having 40 data inputs mapped to pixel locations and 20 data inputs configured to receive metadata associated with a selected portion.

In another example and although not illustrated in FIG. 3, in an embodiment, each of the multiplexers 151, . . . , 15n can have identical inputs (e.g., each of pixels A-K, and other inputs like H_stable, V_stable, etc.). This allows even greater post-design flexibility in configuring the image processor 100, as in such a case, the input bits to the LUT 160 can be generated in any configurable manner.

In an embodiment, the addressing of the LUT 160 may be performed in a number of ways. As an example, if a number of pixel data and metadata (e.g., counters, etc.) that can be output by the multiplexer unit 150 is 60, the LUT 160 can potentially have $2^{60}$ entries. In an example, a subset of the output of the multiplexer unit 150 can be used by the LUT 160, e.g., based on a type of application of the image processor 100. This provides a great flexibility in configuring the image processor 100 (e.g., choose from a large number of possible ways to perform addressing the LUT 160). In contrast, in conventional image processing systems, LUTs are generally hard-coded, thereby providing little or no options in configuring the addressing of the LUTs.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. An apparatus for processing an image, the apparatus comprising:
    an image transformation unit configured to (i) select a portion of the image, wherein the selected portion of the image comprises a plurality of pixels, and wherein a plurality of metadata outputs is associated with the selected portion of the image;
    a multiplexer unit comprising a plurality of multiplexers, wherein each multiplexer of the plurality of multiplexers is configured to (i) receive pixel data of a corresponding subset of the plurality of pixels, (ii) receive a corresponding one or more of the plurality of metadata outputs, and (iii) based on the pixel data of the corresponding subset of the plurality of pixels and the corresponding one or more of the plurality of metadata outputs, generate a corresponding address bit, wherein a plurality of address bits are correspondingly generated by the plurality of multiplexers; and
    a look up table (LUT) configured to (i) receive the plurality of address bits from the multiplexer unit, and (ii) based on the plurality of address bits, output replacement pixel data, wherein the replacement pixel data replaces at least a section of the selected portion of the image.

2. The apparatus of claim 1, wherein the image transformation unit is configured to generate the plurality of metadata outputs associated with the selected portion of the image.

3. The apparatus of claim 1, further comprising:
    an image output unit configured to (i) receive the replacement pixel data, and (ii) replace at least the section of the selected portion of the image with the replacement pixel data to generate a modified image.

4. The apparatus of claim 3, further comprising:
    a print engine configured to print the modified image onto a tangible medium.

5. The apparatus of claim 1, wherein:
    the plurality of address bits forms a first address; and
    the replacement pixel data is stored in the first address of the LUT.

6. The apparatus of claim 1, wherein:
    each multiplexer of the plurality of multiplexers is configured to output, as the corresponding address bit, either (i) pixel data of a pixel of the corresponding subset of the plurality of pixels, or (ii) a metadata output of the corresponding one or more of the plurality of metadata outputs.

7. The apparatus of claim 1, wherein each multiplexer of the plurality of multiplexers is configured to:
    receive a corresponding selection signal; and
    based on the received selection signal, output, as the corresponding address bit, either (i) pixel data of a pixel of the corresponding subset of the plurality of pixels, or (ii) a metadata output of the corresponding one or more of the plurality of metadata outputs.

8. The apparatus of claim 1, wherein the image transformation unit is further configured to (i) control selection of the selected portion of the image, and (ii) traverse the selected portion of the image over multiple areas of the image.

9. The apparatus of claim 1, wherein:
    the replacement pixel data includes replacement values for one or more center pixels of the selected portion of the image; and
    the one or more center pixels is located in substantially a center portion of the selected portion of the image.

10. The apparatus of claim 1, wherein the plurality of metadata outputs comprises one or more of (i) an indication of horizontal image stability of the selected portion of the image, (ii) an indication of vertical image stability of the selected portion of the image, (iii) an indication of image instability of the selected portion of the image, (iv) a location of the selected portion of the image relative to the image, and (v) movement of the selected portion of the image relative to a previous selected portion of the image.

11. The apparatus of claim 1, wherein:
    the plurality of metadata outputs comprises an indication of whether the plurality of pixels of the selected portion of the image matches a pattern; and
    in response to the plurality of metadata outputs comprising an indication that the plurality of pixels of the selected portion of the image matches a pattern, the LUT is further configured to provide a portion of a font or a portion of a character as the replacement pixel data.

12. The apparatus of claim 1, wherein the apparatus is configured to provide a non-linear transformation of pixel data corresponding to the plurality of pixels into the replacement pixel data.

13. The apparatus of claim 12, wherein the non-linear transformation includes at least one of line enhancement, curve enhancement, pattern replacement, and toner explosion compensation.

14. The apparatus of claim 1, wherein the image transformation unit, the multiplexer unit, and the LUT are circuits of a monolithic image processing integrated circuit.

15. A method of processing an image, comprising:
    selecting a portion of the image, wherein the selected portion of the image comprises a plurality of pixels, and wherein a plurality of metadata outputs is associated with the selected portion of the image;
    generating, by each multiplexer of a plurality of multiplexers, a corresponding address bit such that a plurality of address bits are correspondingly generated by the plurality of multiplexers, wherein generating, by each multiplexer of the plurality of multiplexers, the corresponding address bit comprises
        receiving, at each multiplexer of the plurality of multiplexers, (i) pixel data of a corresponding subset of the plurality of pixels, and (ii) a corresponding one or more of the plurality of metadata outputs, and
        based on (i) the pixel data of the corresponding subset of the plurality of pixels and (ii) the corresponding one or more of the plurality of metadata outputs, generating, at each multiplexer of the plurality of multiplexers, the corresponding address bit; and
    based on the plurality of address bits, looking up replacement pixel data that is to replace at least a section of the selected portion of the image.

16. The method of claim 15, further comprising:
    replacing at least the section of the selected portion of the image with the replacement pixel data to generate a modified image.

17. The method of claim 16, further comprising:
    providing the modified image to a print engine; and
    printing, by the print engine, the modified image onto a tangible medium.

18. The method of claim 15, wherein:
    the replacement pixel data includes replacement values for one or more center pixels of the selected portion of the image; and
    the one or more center pixels is located in substantially a center portion of the selected portion of the image.

19. The method of claim 15, wherein the plurality of metadata outputs comprises one or more of (i) an indication of horizontal image stability of the selected portion of the image, (ii) an indication of vertical image stability of the selected portion of the image, (iii) an indication of image instability of the selected portion of the image, (iv) a location of the selected portion of the image relative to the image, and (v) movement of the selected portion of the image relative to a previous selected portion of the image.

20. The method of claim 15, wherein:
- the plurality of metadata outputs comprises an indication of whether the plurality of pixels of the selected portion of the image matches a pattern; and
- looking up replacement pixel data further comprises
  - in response to the plurality of metadata outputs comprising an indication that the plurality of pixels of the selected portion of the image matches a pattern, looking up replacement pixel data such that the replacement pixel data comprises a portion of a font or a portion of a character.

* * * * *